(12) United States Patent
Joseph

(10) Patent No.: US 6,401,305 B1
(45) Date of Patent: Jun. 11, 2002

(54) CABLE TIE APPARATUS

(76) Inventor: John Michael Joseph, 2827 Echo Way, Sacremento, CA (US) 95821

( * ) Notice: Subject to any disclaimer, the term of this patent is extended or adjusted under 35 U.S.C. 154(b) by 0 days.

(21) Appl. No.: 09/620,590

(22) Filed: Jul. 20, 2000

(51) Int. Cl.$^7$ .............................................. B65D 63/00
(52) U.S. Cl. .................................... 24/16 R; 24/17 AP
(58) Field of Search ............................ 24/16 R, 16 PB, 24/17 AP, 30.5 R, 30.5 P, 300, 302, 339, 453; 248/59, 60, 71, 68.1, 74.3

(56) References Cited

U.S. PATENT DOCUMENTS

| | | | | |
|---|---|---|---|---|
| 3,233,801 A | * | 2/1966 | Schulenberg | 24/16 PB X |
| 3,502,396 A | * | 3/1970 | Greenberg | 24/302 X |
| 3,835,505 A | * | 9/1974 | Shelbridge | 24/16 R |
| 3,979,094 A | * | 9/1976 | DeWitt | 248/74.3 X |
| 4,285,146 A | * | 8/1981 | Charles et al. | 24/16 PB X |
| 6,073,315 A | * | 6/2000 | Rasmussen | 24/16 PB |

* cited by examiner

*Primary Examiner*—Robert J. Sandy
(74) *Attorney, Agent, or Firm*—Alfred F Hoyte, Jr.

(57) ABSTRACT

An improved cable tie apparatus includes a flexible strap and a locking head. The flexible strap has a series of spaced apertures formed therein. A first group of apertures extending from one end and extending over at least half of the strap, the first group serving to allow for adjustably securing the strap over a cable or other object to be bundled. A second group of apertures extends from an opposing end of said strap, two of the apertures may be used in combination with the locking head to secure a portion of the strap about one loop of a cable to be bundled. The locking head has a central post terminating at opposing ends with radially extending, axially aligned discs sized for locking engagement with the apertures. A third axially aligned disc positioned intermediately along the axis of the post and also radially extending therefrom separates the opposing end discs so that apertures on either end of the strap may be selectively and discretely engaged and disengaged from said discs. The portion of the strap secured to the single loop of the cable may remain attached as the cable is unbundled, thus obviating the need to locate the cable tie when the cable is to be rebundled.

8 Claims, 4 Drawing Sheets

CABLE TIE APPARATUS

BACKGROUND OF THE INVENTION

The present invention relates generally to devices and methods for bundling cables. More particularly, it relates to an improved cable tie apparatus which is inexpensive to manufacture and simple to use.

STATEMENT OF THE PRIOR ART

Many types of cable ties are known in the art ranging from the simple wire twist to fairly complicated devices requiring special tools for implementation. The simpler mechanisms, e.g., multiple notch strap with integral locking head, suffer from the drawback in that they are not capable of repeated use without failure, or are incapable of retaining heavy or bulky cables effectively. The more complex mechanisms, in addition to often requiring special tools, e.g., for tightening about the cable, are subject to failure. Since non-standard parts are usually used with these ties, replacement of damaged or lost parts is usually not possible.

U.S. Pat. No. 5,367,749 issued to Takeuchi discloses a cable tie having a typical apparatus of lock portion and band portion. The band portion is permanently attached to the lock portion, with the band having a series of regularly spaced sawtooth indentations which cooperate with a sawtooth locking projection formed inside the lock portion. By contrast, the present invention concerns a cable tie apparatus having a separate strap and locking portion.

U.S. Pat. No. 4,993,669 issued to Dyer discloses a cable tie apparatus with a separate tie head and strap. The tie head has a pair of slots for receiving opposing ends of the strap, with a locking means formed within the slots in order to securely retain the strap. The present invention contemplates a cable tie apparatus having a tie head and a separate strap. The tie head retains the strap at three locations, thereby allowing the tie head and strap to remain attached to the cable when the cable is unbundled.

U.S. Pat. No. 4,149,298 issued to Forest discloses a tie member for mounting a cable to a chain link fence. The device has means for securely clamping to a single wire of the chain link fence and the cable to be attached to the fence. By contrast, the present invention is a cable tie apparatus having a tie head adapted for retaining a strap securely about a single loop of a bundled cable, while retaining the remaining portion of the strap about the other loops of the cable in order to secure the bundle.

None of the above inventions and patents, taken either singly or in combination, is seen to describe the instant invention as claimed.

SUMMARY OF THE INVENTION

The present invention overcomes the disadvantages of the prior art by providing an improved cable tie apparatus. The apparatus comprises a flexible strap and a locking head. The flexible strap has a series of spaced apertures formed therein. A first group of apertures extending from one end and extending over at least half of the strap, the first group serving to allow for adjustably securing the strap over a cable or other object to be bundled. A second group of apertures extends from an opposing end of said strap, two of the apertures may be used in combination with the locking head to secure a portion of the strap about one loop of a cable to be bundled. The locking head has a central post terminating at opposing ends with radially extending, axially aligned discs sized for locking engagement with the apertures. A third axially aligned disc positioned intermediately along the axis of the post and also radially extending therefrom separates the opposing end discs so that apertures on either end of the strap may be selectively and discretely engaged and disengaged from said discs. The portion of the strap secured to the single loop of the cable may remain attached as the cable is unbundled, thus obviating the need to locate the cable tie when the cable is to be rebundled.

Accordingly, it is a principal object of the invention to provide an improved cable tie apparatus.

It is an object of the invention to provide an improved cable tie apparatus having a separate locking head and strap.

It is another object of the invention to provide an improved cable tie apparatus having a tab at the end to prevent failure of the aperture at the end of the strap.

It is another object of the invention to provide an improved cable tie apparatus made out of a flexible, elastic material.

It is another object of the invention to provide an improved cable tie apparatus having a strap made of EPDM® material.

It is another object of the invention to provide an improved cable tie apparatus having a strap made of TPE® material.

Finally, it is a general object of the invention to provide improved elements and apparatus thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2(*b*) shows a cross section of the strap of FIG. 2(*a*).

FIG. 2(*c*) shows a plan view of an alternative arrangement of the strap of the cable tie apparatus.

FIG. 4(*b*) shown in use securing a single loop of cable.

DETAILED DESCRIPTION

Figure 1:
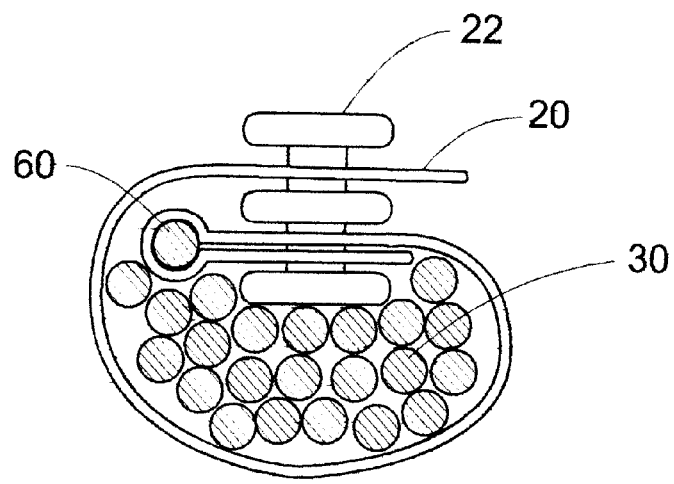
FIG. 1 shows a perspective view of the cable tie apparatus of the invention shown in use securing a cable.
Figure 2A:
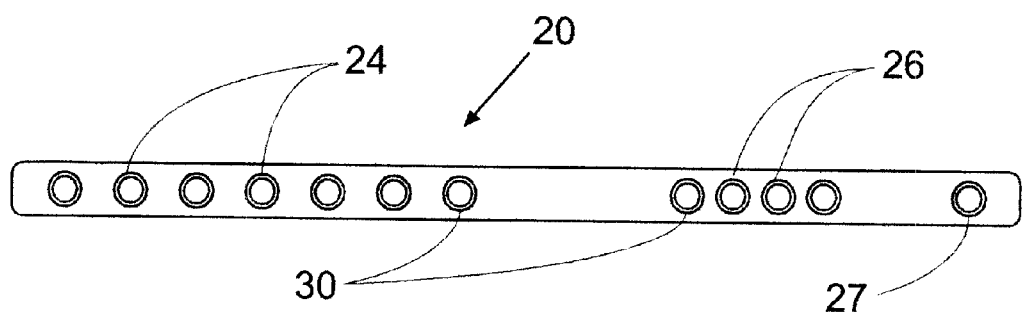
FIG. 2(*a*) shows a plan view of the strap of the cable tie apparatus.
Figure 2B:
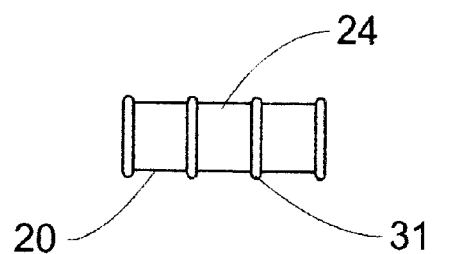
Figure 2C:
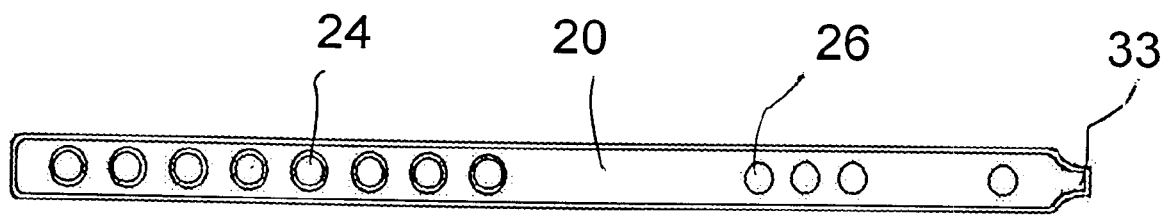
Figure 3:
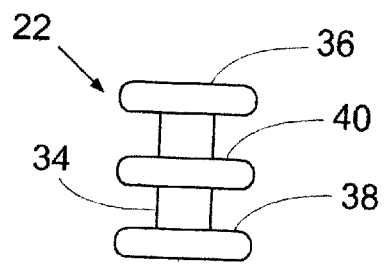
FIG. 3 shows a side view of the tie head of the cable tie apparatus.

Referring now to FIGS. 1–4, a cable tie apparatus, made in accordance with the concept of the present invention, and generally indicated by the numeral 10, is shown. The apparatus 10 has two main components, a strap 20 and a tie head 22.

The strap 20 is preferably made of rubber or other elastic material. High strength plastics or other flexible material may also be used. Preferred materials for the strap 20 include EPDM® or TPE® materials, which may be injection molded to form a strap of unitary construction. Two groups of apertures 24, 26 are formed extending from the opposing ends of the strap 20. The first group of apertures 24 allow for adjustably securing the strap 20 about the cable bundle 30. Preferably, each of the apertures 24 have a reinforcing bead 31 formed about the perimeter serving to prevent failure of the strap 20 under high stress conditions. The bead 31 could be formed as part of the molding process as would be apparent to one skilled in the art. Certain moldable elastic materials such as TPE® require additional material extending beyond the last aperture 26 in the form of a tab 33 (FIG. 2(c)) in order to ensure the integrity of the aperture 26 nearest the end of the strap. This tab 33 is formed during the molding process by extending the mold and allowing the molten material to flow into the extension (not shown) and "knit". Apertures 26 allow for securing the strap 20 about a single loop of the bundled cable 30 as will be explained in more detail later.

The tie head 22 has a central post 34 which connects opposing end discs 36, 38 as well as central disc 40. The end discs 36, 38 preferably are of the same diameter. Central disc 40 has a slightly greater diameter, and may have a slightly greater thickness, than end discs 36, 38 to facilitate grasping and manipulation of the tie head 22 when bundling and attaching the cable tie apparatus 10 to the cable 30. An integral construction may be used to form tie head 22, the tie head 22 preferably being formed of unitary construction, e.g., by molding. Any rigid, durable material may be used to form the tie head 22. Apertures 24, 26 are sized to be stretched around and over end discs 36, 38 in the same manner as buttons are pushed through buttonholes. However, in order to ensure that the strap 20 remains securely attached to tie head 22 under high stress conditions, the apertures 24, 26 are substantially smaller than end discs 36, 38. As has been previously mentioned, apertures 24 allow for securing the strap 20 about the cable bundle 30, while apertures 26 allow for securing the strap 20 about a single loop of the cable bundle 30.

Figure 4A:
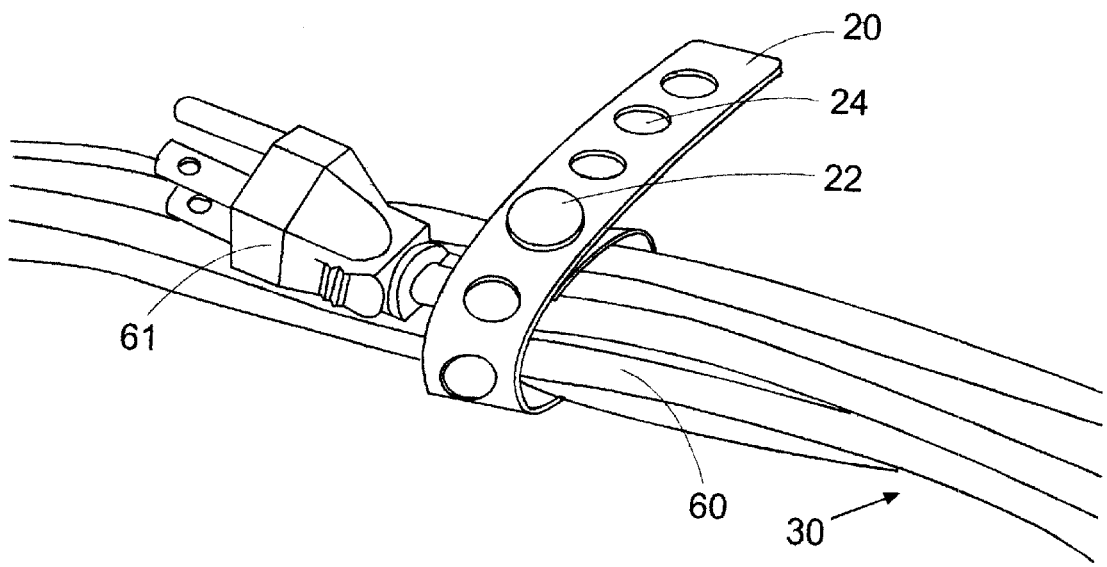
FIG. 4(*a*) shown in use securing a cable bundle.
Figure 4B:
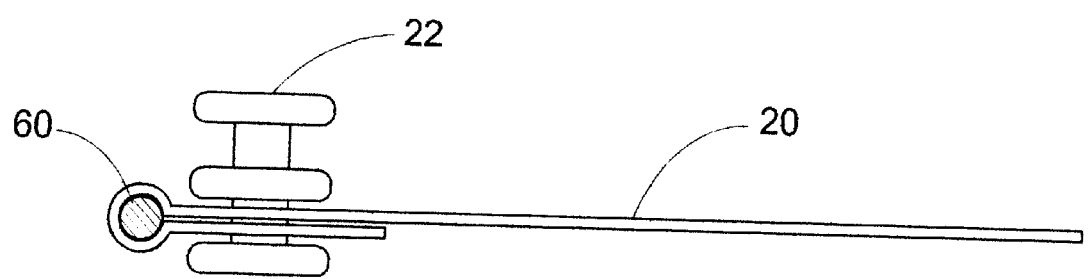

In operation, as can be seen most clearly in FIGS. 1 and 4, two of the apertures 26 are placed over disc 38, thereby causing an end portion 50 of the strap 20 to be folded back over to form a tight loop 52 capable of secure attachment to a single loop of cable 30. It should be noted that the apertures 24, 26 are smaller than discs 36, 38 and that some stretching of the strap 20 is required in order to secure the strap 20 to the tie head 22. This loop allows the cable tie 10 to be secured to the cable 30 even when the cable 30 is unbundled, and also ensures the cable tie 10 will stay in position relative to the cable bundle 30. Once the loop 52 has been formed about the single loop of cable 30 thus securing the strap 20 to the cable 30, the cable 30 is bundled and the proper length of strap 20 required to secure the cable bundle 30 can be determined. Once the proper length of strap 20 is determined, the proper aperture 24 is selected and the end disc 36 is inserted therethrough in the manner described above. It can be appreciated that the size of the strap 20, apertures 24, 26, and tie head 20 must be relatively scaled down to accommodate cables 30 or cords having a relatively small diameter.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. A cable tie apparatus for securing a cable bundle comprising:
   a strap, said strap having first and second series of spaced apertures formed therein, said first and second series of apertures extending from opposing ends of said strap;
   a tie head, said tie head having a pair of mutually opposed locking members for lockably securing said strap about said cable bundles, said mutually opposed locking members disposed at opposite ends of an elongated connection member, at least a portion of each of said locking members extending radially from said connection member, said radially extending portions sized to pass through a selected aperture from either of said series of apertures and provide an engagement surface sufficient to prevent unintended disengagement of said tie head from said selected aperture.

2. The arrangement of claim 1 wherein said strap may be secured about said cable bundle, with a portion of said strap secured about a single loop of said cable bundle.

3. The arrangement of claim 1 wherein said mutually opposed members are disc shaped.

4. The arrangement of claim 3 including a third disc, said third disc centrally located along the axis of said elongated connection member between said mutually opposed disc shaped locking members.

5. The arrangement of claim 4 wherein said mutually opposed disc shaped locking members are axially aligned in parallel spaced relation.

6. A cable tie apparatus for securing a cable bundle comprising:
   a strap, said strap having first and second series of spaced apertures formed therein, said first and second series of apertures extending from opposing ends of said strap;
   a tie head, said tie head having means for locking engagement within a selected aperture of said series of apertures, said means for locking engagement of said tie head comprising a pair of mutually opposed locking members, one of said locking members extending removably through a selected pair of said first series of apertures to secure a selected length of said strap about a single loop of said cable bundle, an opposing one of said locking members extending removably through a selected one of said second series of apertures;
   wherein a loop of said strap for securing said cable bundle is formed by extending said strap from said selected pair of apertures about said cable bundle and inserting said opposing locking member through said selected one of said second series of apertures.

7. The cable tie apparatus of claim 6 wherein said mutually opposed members are disc shaped and are connected by a single axially centered post.

8. The cable tie apparatus of claim 7 including a third disc, said third disc centrally located along the axis of said post between said mutually opposed disc shaped locking members.

* * * * *